Apr. 10, 1923.
H. B. GRANT
LIQUID ELEVATING DEVICE FOR MOTOR VEHICLE ENGINES
Original Filed Dec. 18, 1920
1,451,158
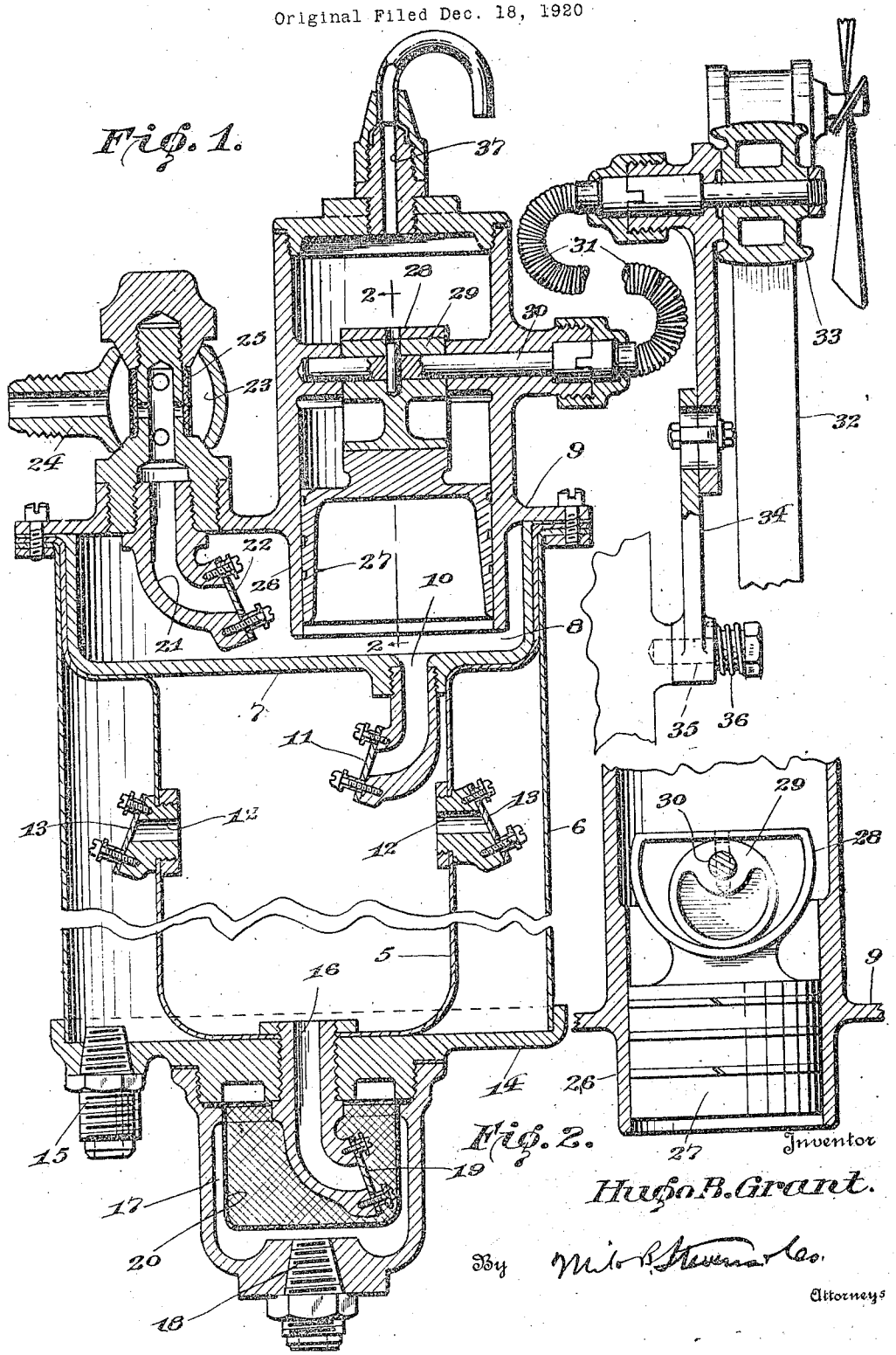

Patented Apr. 10, 1923.

1,451,158

UNITED STATES PATENT OFFICE.

HUGO B. GRANT, OF CHICAGO, ILLINOIS, ASSIGNOR TO STEWART-WARNER SPEEDOMETER CORPORATION, OF CHICAGO, ILLINOIS, A CORPORATION OF VIRGINIA.

LIQUID-ELEVATING DEVICE FOR MOTOR-VEHICLE ENGINES.

Application filed December 18, 1920, Serial No. 431,793. Renewed September 7, 1922. Serial No. 586,803.

*To all whom it may concern:*

Be it known that I, HUGO B. GRANT, a citizen of the United States, residing at Chicago, in the county of Cook and State of Illinois, have invented new and useful Improvements in Liquid-Elevating Devices for Motor-Vehicle Engines, of which the following is a specification.

This invention relates to apparatus or devices for conveying liquids from a storage tank or other source of supply to a receptacle located at a higher level so that the liquid may be fed from the latter by gravity to the place of use. Apparatus of this kind has been employed in connection with the liquid fuel supply systems of motor vehicle engines, and the invention has been illustrated in connection with such a system, but it is to be understood that the invention is not limited thereto, and that it is also capable of use in connection with the lubrication system, or applicable to any liquid dispensing or delivery system requiring a means for conveying a liquid from a certain level to a higher level.

The invention has for its object to provide a very simple and highly efficient apparatus of the kind stated in which the well-known vacuum principle is employed.

The object stated is attained by means of a novel combination and arrangement of parts to be hereinafter described and claimed, and in order that the same may be better understood, reference is had to the accompanying drawing forming a part of this specification.

In the drawing;

Figure 1 is a central vertical section of the apparatus, and Fig. 2 is a vertical section on the line 2—2 of Fig. 1.

Referring specifically to the drawing, 5 denotes a liquid receiving vessel which is positioned in an overflow receiving vessel 6. The top of the vessel 5 is closed by a head, 7 which also extends over to the side of the outer vessel 6 and is continued upwardly to form a vacuum chamber 8 which is closed at the top by a head 9. The vacuum chamber has a fluid outlet 10 into the vessel 5, said outlet being connected to the chamber bottom formed by the head 7. The outlet 10 has a non-return or check valve 11. To the side of the vessel are fitted overflow outlets 12 into the vessel 6, the same being also provided with non-return or check valves 13.

The bottom of the vessel 6 is closed by a cap 14 having a return connection 15 to the liquid supply reservoir. The vessel 5 is closed at the bottom and seats on the head 14, and to the latter is connected an outlet 16 leading from the vessel 5 and opening into a strainer chamber 17 fitted to the cap 14, said chamber having an outlet 18 for connection with the carburetor or other apparatus to which the liquid is to be delivered by gravity. The outlet 16 has a non-return or check valve 19 and it opens into a strainer 20 located in the chamber 17.

The cap 9 carries a liquid inlet connection 21 to the vacuum chamber 8, said connection being provided with a non-return or check valve 22. This connection has a strainer chamber 23 and a nipple 24 by means of which latter connection is made with the liquid supply tank. The chamber 23 contains a strainer 25.

The following means are provided for producing a vacuum in the chamber 8:

The cap 9 forming the top of the chamber 8 is provided with an air pump cylinder 26 which opens into the chamber and contains a reciprocating plunger 27. The top of the plunger 27 has a strap 28 which fits over an eccentric 29 located in the cylinder 26 and carried by a shaft 30 supported by bearings on the cylinder wall. The shaft 30 extends from one side of the cylinder 26 and it is here coupled to a flexible drive shaft 31.

The shaft 31 is driven from some movable part of the engine, preferably the fan belt 32, the shaft being connected to a friction wheel 33 which is in contact with the belt. The friction wheel 33 is carried by a bracket arm 34 pivoted, as shown at 35 to some convenient portion of the engine according to the design of the latter. A spring 36 engageable with the bracket arm 34 holds the wheel 33 in frictional contact with the belt 32. It will therefore be evident that the air pump operates when the engine is running. The bracket arm 34 is composed of two slidably connected sections for adjustment. The pump cylinder 26 is provided with an air vent 37 above the plunger 27.

In operation, the liquid entering the chamber 8 in response to the suction produced therein by the air pump, flows by gravity through the outlet 10 into the vessel 5 and passes from the latter through the outlet 16 into the chamber 17 from which latter it flows through the outlet connection 18 to the carburetor. If the liquid level in the vessel 5 gets as high as the overflow outlets 12, the excess liquid passes through the latter into the vessel 6 and escapes from the same through the outlet 15 back to the main supply tank. A constant level is therefore automatically maintained in the vessel 5, and this is accomplished without the employment of a float.

While the construction shown in the drawing is the preferred one, it is to be understood that various modifications may be made without a departure from the spirit and scope of the invention as claimed hereinafter. The air pump can be driven from any moving parts or adjuncts of the engine so that the rate of flow of liquid through the vessels 5 and 6 is relative to the engine speed and load, and also such that a constant level is maintained in the vessel 5. The apparatus is simple in construction and positive in action as it is operated by the engine itself and all springs and floats have been eliminated, and it does not affect the running of the engine by interfering with the suction in the engine cylinders. As the apparatus is operated directly by the engine itself, the fuel supply of the latter, if the apparatus is used for this purpose, varies according to the speed or load, so that any increase in the speed of the engine is accompanied by an increase in the amount of fuel delivered to the carburetor. The mechanism is simple and durable, and requires no attention except ordinary cleaning and inspection, and occasional lubrication of the air pump and its driving means, and all parts of the air pump are readily accessible for inspection or replacement.

With the ordinary vacuum fuel feed tank, if the supply of fuel becomes exhausted, it is necessary to fill the vacuum tank also when replenishing the supply, because the first few strokes of the engine will not create sufficient suction in the intake manifold to start a flow from the main fuel supply tank to the vacuum tank for the starting of the engine on its own power. This is not necessary with the present apparatus, because there is a positive pumping action set up when the engine starter is operated to turn over the engine, and a few turns of the crank shaft suffice to draw fuel from the main supply tank to the empty vacuum tank, this being due to the fact that the air pump is operatively connected to the engine.

I claim:

1. In a vacuum liquid supply apparatus, a liquid receiving vessel having a liquid outlet and an overflow outlet, a vacuum chamber carried by and located above said vessel, and having a liquid outlet thereinto and a liquid inlet, and an air pump having its cylinder opening into the vacuum chamber.

2. In a vacuum liquid supply apparatus, a liquid receiving vessel, an overflow receiving vessel in which the first-mentioned vessel is mounted, a head closing the top of the liquid receiving vessel, and also forming the top of the overflow receiving vessel, said head having an upward extension to form a vacuum chamber, a head closing the top of said chamber, said head having a fluid inlet, and an air pump cylinder on said head opening into the vacuum chamber, said chamber having a fluid outlet into the liquid receiving vessel, and said vessel having a liquid outlet, and also an overflow outlet into the overflow receiving vessel.

In testimony whereof I affix my signature.

HUGO B. GRANT.